Oct. 11, 1949.　　　D. P. GOSHEFF　　　2,484,163
FILLER PLUG AND ELECTROLYTE LEVEL
INDICATOR FOR STORAGE BATTERIES
Filed Sept. 28, 1948

Dragie P. Gosheff
INVENTOR.

BY
*Thomas A. O'Brien*
*and Harvey B. Jackson*
Attorneys

Patented Oct. 11, 1949

2,484,163

UNITED STATES PATENT OFFICE 2,484,163

FILLER PLUG AND ELECTROLYTE LEVEL INDICATOR FOR STORAGE BATTERIES

Dragie P. Gosheff, Tampa, Fla.

Application September 28, 1948, Serial No. 51,526

4 Claims. (Cl. 136—182)

This invention relates to a novel and highly improved screw-type filler plug for automobile and equivalent storage batteries, a style of plug which is unique in that it has incorporated a distinctive and practical water level indicator which, it is submitted, is more aptly suited to attain wanted ends than those which have heretofore been adopted and proposed by others in this line of endeavor.

As the introductory statement of the invention implies, I am conversant with the prior state of the art to which the invention relates and am therefore aware that many and varied types and forms of battery caps and filler plugs have been devised by others. For example C. E. Moore discloses a battery gage in Patent 1,260,934 of March 26, 1918 which is of a portable insertable and removable type and which necessitates removal of the usual screw plug or cap in order that the gage may be inserted, by hand, to bring the float operable indicator into play. In Patent 2,033,279 to John A. Flynn, a low level indicator with storage batteries is provided, the same being essentially electro-mechanical and during servicing and refilling steps removal of the cap to the cell is required. In Richard Raines another type of storage battery indicator is disclosed—this is Patent 1,611,677 of December 21, 1926, and here again it would be necessary to remove the plug entirely in order to add water to the cell.

By contrast and in comparison, it is an objective of the present invention to provide a simple, practical and efficient screw-type plug which when once applied to the battery case does not, thereafter, have to be removed, the construction being such that a filler hole is conveniently provided for replenishing the water supply in the cell, there being a readily openable and closable cover for said filler hole.

In an effort to improve upon prior art constructions I have also evolved and produced a filler plug of the type stated which is characterized by a depending cylindrical type adapter and guide and an associated float means, these parts being such that the float, which operates the indicator, is in constant contact with the surface of the electrolyte in the cell.

Another object of the invention is to provide a filler plug of the above stated type which prevents undue wear and possible binding of the indicator unit due to the sloshing action of the electrolyte when the car is in motion and which in addition, prevents splashing of the electrolyte into the upper portion of the plug which, in the present instance, is characterized by a central upstanding dome-like shield for the indicator.

Other objects, features and advantages will become apparent from the following detailed description and drawings and particularly from a specific listing of the advantages at the terminal portion of the detailed description In the drawings, wherein like numerals are employed to designate like parts throughout the views.

Figure 1:
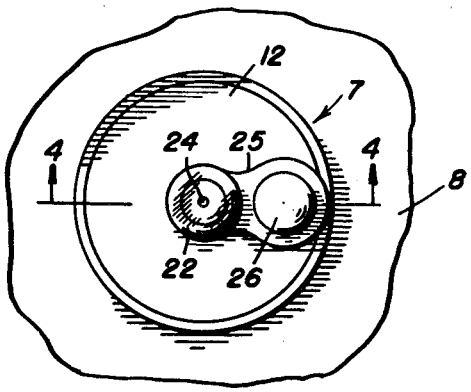
Figure 1 is a top plan view of a fragmentary portion of the case of a storage battery, said view illustrating my novel filler plug and low level indicator carried thereby.
Figure 2:
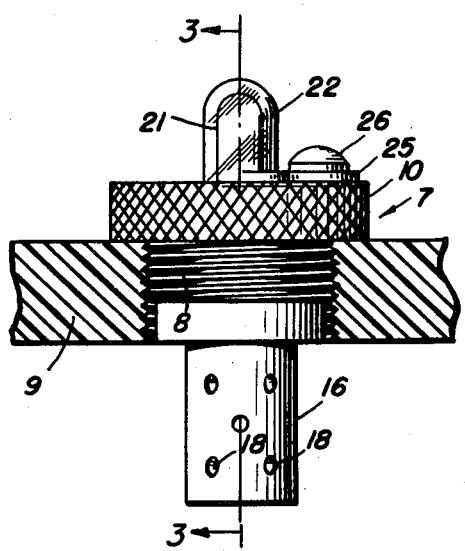
Figure 2 is a vertical elevational view of the improved filler plug, the battery case being fragmentarily shown in section.
Figure 3:
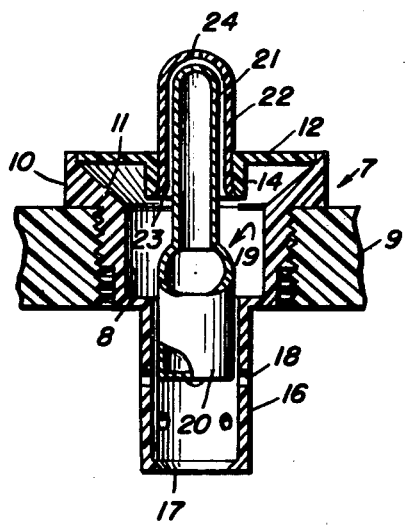
Figure 3 is a central vertical section on the line 3—3 of Figure 2, looking in the direction of the arrows, certain portions appearing in elevation.

Referring to the drawings by reference numerals and lead lines, the filler plug proper is denoted by the numeral 7 and is characterized by an intermediate externally screw-threaded ring-like portion 8 which is threaded into the customary screw threaded hole in the storage battery 9. The upper end portion is enlarged to provide a head 10, the periphery of same being suitably milled or knurled, as shown in Figure 2. Interiorly this portion is provided with a bevelled annular surface 11 which serves to funnel the water into the cell (not shown). Provision is also made to provide a shouldered portion or ledge for the outer peripheral edge portion of an annular cover 12 fitted firmly in place, as brought out in Figures 3 and 4. In respect to the cover it will be noted that it is provided with an eccentrically arranged filler hole or opening 13 of appropriate size. At the center the cover has a depending collar 14 with a relieved surface 15. Reverting to the plug proper, it will be seen that the lower portion thereof comprises a central depending sleeve or adapter 16. This part 16 is cylindrical in cross section and of an appropriate length and at the bottom an annular stop shoulder 17 is provided. On the sides I provide a plurality of appropriately arranged water feeder holes 18. The length of the adapter is such that the lower shouldered end is intended to project into the cell and terminate in close proximity to the battery plates. It will be observed that the unit 7 is of one-piece form for ease of manufacture.

The float unit is denoted by the numeral 19 and is of miniature bottle-like design and is characterized by a cylindrical float 20 which is operable in the guide forming adapter 16, said float having a reduced upstanding indicator element 21. In practice the latter is preferably vividly colored, for instance, with the color green.

The aforementioned shield is of dome-like form and is denoted by the numeral 22. It is of transparent material and of a diameter to fit into the opening provided by the collar 14 and the associated aperture in the cover 12. The lower open end of the shield is swaged and flanged, as at 23 where it is fitted into proper relation with the assembling and retention surface 15. Thus, the shield is swivelly connected with the cover in substantially fluid tight relationship. The crest or crown of the shield is provided with a gas escape vent 24. The intermediate portion of the shield is provided with an integral radially disposed arm 25 which is in rotatable wiping contact with the top surface of the cover 12 and which constitutes a closing lid or closure for the filler hole 13. The said arm is provided with an upstanding boss or nodule and this provides a convenient finger-piece 26 to facilitate opening and closing said lid.

The adapter 16 is of proper length to receive and maintain the indicating unit, 19, in vertically disposed operative position, permitting the indicating unit to be at all times in contact with the surface of the electrolyte; and prevents undue wear or possible binding of the indicator unit due to the sloshing action of the electrolyte when car is in motion, also prevents splashing of electrolyte into the upper portion of the plug and subsequent loss through the vent hole. The cover plate 12 is of required section and dimension to be pressed into the recessed upper portion of the plug body, as evident from Figures 3 and 4, to provide a requisite leak-proof closure at this point in the construction. The extended collar 14 is provided to give requisite stability and provides a satisfactory assembling and retaining element for the swaged or expanded lower end of the dome or shield 22. The enlarged basal portion of the unit 19, which is the float proper, is of such diameter externally that it fits appropriately into the adapter. Sufficient space exists between the parts 16 and 20 to permit water to be delivered through said space and also to permit unhampered discharge of chemical gases.

I refer now to certain salient features and advantages attending a structure of the type herein shown and described, to wit:

1. This accessory provides means for the addition of water necessary to maintain efficiency of a storage battery cell without necessitating removal of the plug or any part thereof, saving considerable time in servicing of the battery and eliminating loss or damage to same, due to removal.

2. The indicating unit, in direct contact with the electrolyte, unaffected by electroylte gases, provides constantly visible indication of the true level of said electrolyte.

3. The indicating unit is of monolithic construction, eliminating possibility of disarrangement that would be present in multiple assembly due to sloshing of electrolyte.

4. The float adapter and guide of the plug body, in addition to protecting the indicating unit from undue wear, due to splashing action of electrolyte, also prevents splash of electrolyte into the upper portion of the plug that would result in an appreciable amount of the electrolyte being forced through the vent opening provided for the escape of the gases formed within the cell by chemical actions.

5. The design and structure of the entire assembly permits mass production through molded plastic or rubber compounds, using simple dies, and invokes the utilization of a minimum number of simple assembly operations. And, in this type of article which must be produced at a unit cost of a few cents to make it usable, this aspect is very important.

Figure 4:
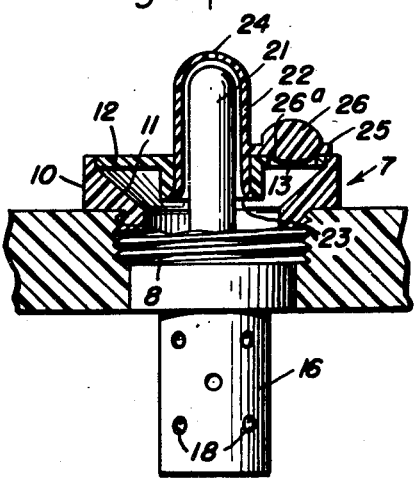
Figure 4 is a view in section and elevation taken approximately on the plane of the line 4—4 of Figure 1, looking in the direction of the arrows.
Figure 5:
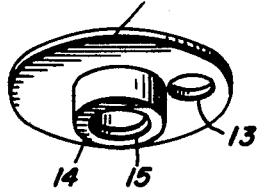
Figure 5 is a perspective of one of the details.

Reference being had again to the aforementioned finger-piece, and in particular reference to Figure 4, it will be seen that the underside of same, may, if desired, be fashioned with a convex boss to serve as a detent. This detent fits into the filler hole 13 and prevents loose swinging of the arm 25. It is to be mentioned, in addition, that the lower open end of the shield 22 is swedged to form the aforementioned flange and the arrangement here may be such as to incorporate sufficient of spring-like action to assist in holding the detent in the opening 13 and consequently preventing unwanted loose swinging of the arm 25 and consequent unwanted uncovering of the filler hole 13.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. A storage battery filler plug and indicator of the class shown and described comprising a screw-plug having a float adapter and an upstanding axially centered transparent dome, a float actuable in the adapter and having a colored indicator operable in said dome, said dome being swivelly mounted in the plug, the latter having a water filler hole and said dome having readily openable and closable lidding and closure means for said filler hole, said means being a plate swingable in an arc at right angles to axis of said dome and being in wiping contact with the adjacent portion of the plug.

2. A storage battery filler plug and indicator of the class shown and described comprising a screw-plug having a float adapter and an upstanding axially centered transparent dome, a float actuable in the adapter and having a colored indicator operable in said dome, said dome being swivelly mounted in the plug, the latter having a water filler hole and said dome having readily openable and closable lidding and closure means for said filler hole, said means being a plate swingable in an arc at right angles to axis of said dome and being in wiping contact with the adjacent portion of the plug, and having a nodule providing a finger-piece.

3. As a new article of manufacture and a suitable component detail of a filler plug of the class shown and described, a disk-like cover centrally apertured and having an annular collar aligned with said aperture, said cover having an eccentric water filler hole, a transparent dome-like shield, open at its bottom and swaged and swivelly mounted in said collar with its crown portion rising above the plane of said cover and having therein a chemical gas vent, the portion of said shield adjacent said cover having a radial plate in swingable wiping contact with said cover, said plate being a closure for said water hole and provided with a nodule forming a finger-piece.

4. In a storage battery filler plug of the class shown and described, a primary component thereof, a unit comprising an externally screw-threaded ring, an annular enlarged knurled grip atop said ring, the inner periphery of said grip being conical to provide a funneling surface for intake of water, said ring being provided at its bottom with a centered axially depending and elongated cylinder, the latter constituting a float adapter, and having an internal stop flange at the bottom and further having a plurality of water feeder holes, a disk-like cover centrally apertured and fitted into said grip and having an annular collar aligned with said aperture and depending into said grip, said cover having an eccentric water filler hole, a transparent dome-like shield open at its bottom and swivelly mounted in said collar, the crown portion of said shield rising above the plane of said cover and being provided with a vent, the portion of said shield adjacent said cover having a radial arm in swingable wiping contact with the top surface of said cover, said arm being a closure for said water hole and provided with a finger-piece, and a hollow unit comprising an enlarged basal portion constituting a float and a reduced axially upstanding portion defining an indicator, said float being operable in said adapter and said indicator being operable within the confines of said shield, the outside diameter of said float being slightly less than the inside diameter of said adapter.

DRAGIE P. GOSHEFF.

REFERENCES CITED

The following references are of record in the file of this patent:

UNITED STATES PATENTS

| Number | Name | Date |
|---|---|---|
| 1,482,852 | Kloepper | Feb. 5, 1924 |
| 1,525,985 | Feldkamp | Feb. 10, 1925 |
| 1,581,104 | Davis | Apr. 20, 1926 |
| 1,703,233 | Hall et al. | Feb. 26, 1929 |
| 1,878,867 | Leukhardt | Sept. 20, 1932 |